G. A. WILLIAMS.
SIGNALING DEVICE FOR VEHICLES.
APPLICATION FILED MAY 15, 1916.
1,314,289.
Patented Aug. 26, 1919.
2 SHEETS—SHEET 1.
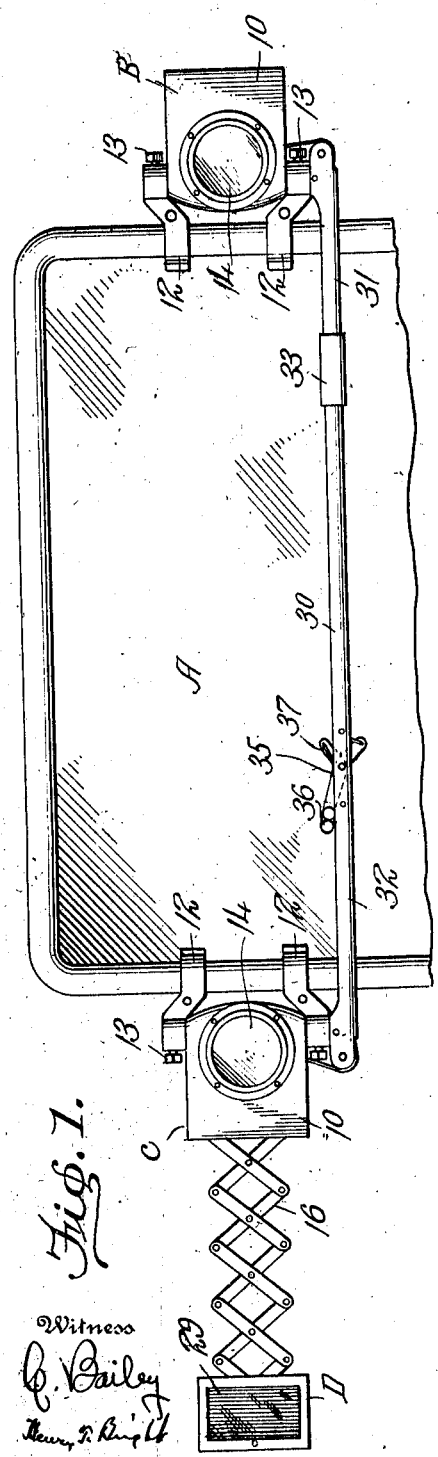
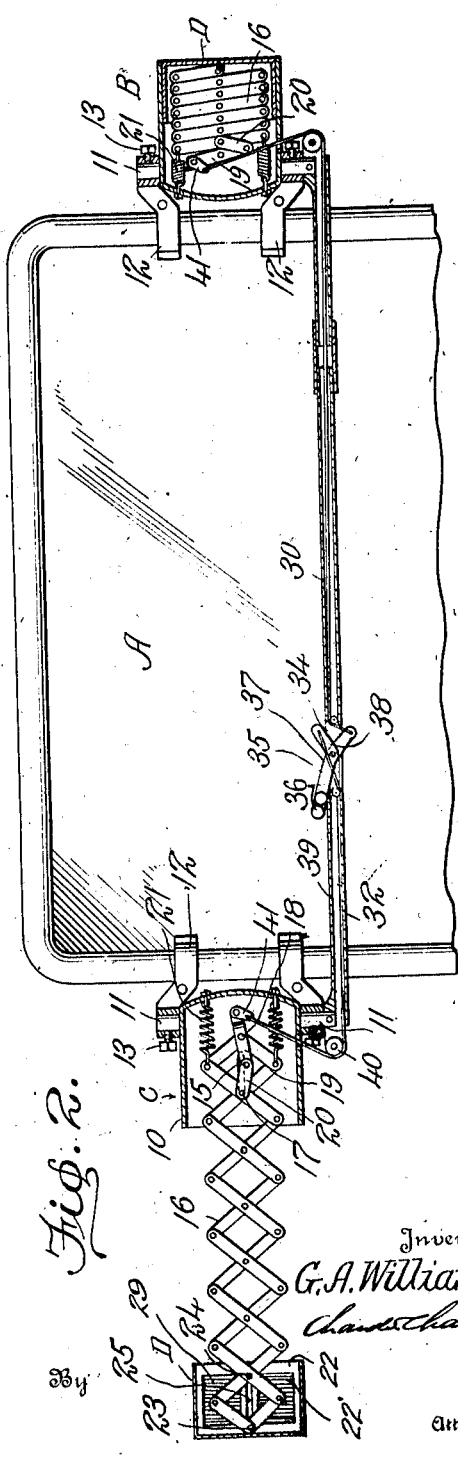
Inventor
G. A. Williams,
Witness

G. A. WILLIAMS.
SIGNALING DEVICE FOR VEHICLES.
APPLICATION FILED MAY 15, 1916.

1,314,289.

Patented Aug. 26, 1919.
2 SHEETS—SHEET 2.

Witness

Inventor
G. A. Williams,
By
Attorney

UNITED STATES PATENT OFFICE.

GEORGE A. WILLIAMS, OF SALT LAKE CITY, UTAH.

SIGNALING DEVICE FOR VEHICLES.

1,314,289.      Specification of Letters Patent.      Patented Aug. 26, 1919.

Application filed May 15, 1916. Serial No. 97,581.

*To all whom it may concern:*

Be it known that I, GEORGE A. WILLIAMS, a citizen of the United States, residing at Salt Lake City, in the county of Salt Lake, State of Utah, have invented certain new and useful Improvements in Signaling Devices for Vehicles; and I do hereby declare the following to be a full, clear, and exact description of the invention, such as will enable others skilled in the art to which it appertains to make and use the same.

This invention relates to signal devices for vehicles and particularly to a signal device for use in connection with automobiles.

It is my purpose to provide an improved signal device of the type named which can be easily associated with an automobile or any type of vehicle in such position that same can be easily operated by the driver without interfering with his control of the vehicle.

It is my further purpose to provide a signal device of the type named which is particularly adapted to be attached to the wind shield of an automobile and operated to indicate the direction in which the automobile is about to move, the mounting of the device on the wind shield avoiding interfering with the side curtains or closed body.

It is also my purpose to provide a signal device for vehicles which will be simple in construction, efficient in action and which can be manufactured at a relatively small cost.

With the above and other purposes in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 3:

Figure 1 is a view in elevation looking at the inner side of the wind shield of an automobile with the improved signal device applied, the left hand signal being in signaling position and the right hand signal being in non-signaling position;

Fig. 2, a view similar to Fig. 1 with the shields for the signals in section and also the connection rod between the signals in section;

Fig. 3 is a section taken horizontally and centrally through the wind shield frame, the casing, the lazy tongs and the signal at the left of Fig. 1.

Figure 4:
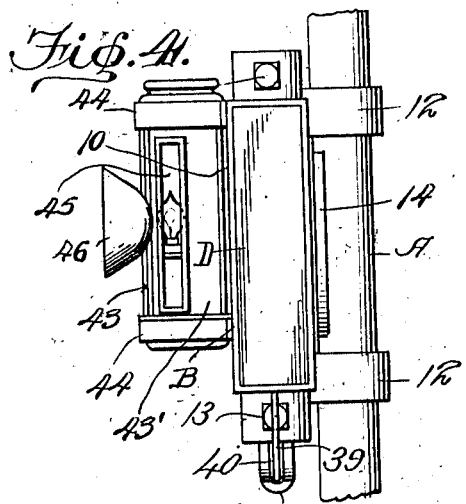
Figure 5:
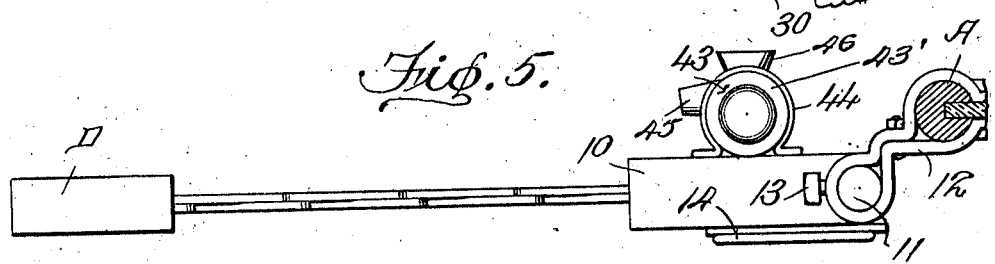

Fig. 4, an end view of the right hand signal in Fig. 1;

Fig. 5, a top view of the left hand signal.

Figure 6:
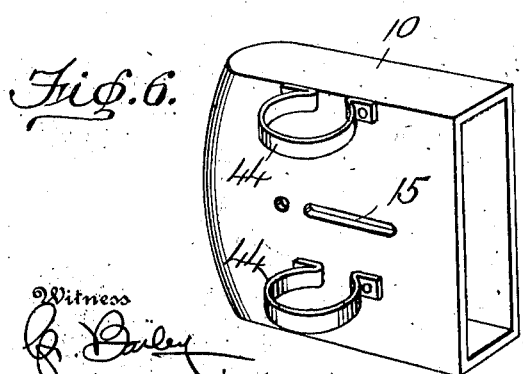

Fig. 6, a perspective view of the shield disclosing the means for supporting a lamp thereon.

Referring to the drawings A indicates the wind shield of an automobile upon which is mounted my improved signal device. This device embodies right and left hand signals B and C respectively. As these signals are identical in construction and operation only the signal C will be described in detail and the reference characters employed will be applied to corresponding parts of the signal B. The signal C comprises a shield 10 in the form of a hollow casing and adapted to house the signal proper when the latter is in non-signaling position. This shield embodies trunnions 11 which are rotatably engaged in brackets 12 secured to the wind shield A. Each bracket 12 carries a binding screw 13 whereby the shield 10 may be secured in a desired position. The shield 10 carries on its inner side a mirror 14 whereby the driver may observe the objects in the rear of the vehicle. The shield 10 is further provided with slots 15 for a purpose that will presently appear. Disposed within the shield 10 is a lazy tongs 16 embodying an intermediate pivot pin 17 which is engaged in and guided by the walls of the slots 15 for the purpose of supporting the inner end of the lazy tongs during its extension and contraction. The innermost elements of the lazy tongs 16 are pivoted upon a pin 18 fixed to the shield 10. Also pivoted upon the pin 18 is a two-arm lever 19 which has pivoted to one end thereof links 20 and these links are in turn pivoted on the pin 17, the lever and links constituting a toggle. The lazy tongs 16 are normally held in contracted position by means of springs 21 having corresponding ends connected to said lazy tongs and their other ends suitably anchored to the shield 10. By the construction so far described it will be apparent that if the end of the lever 19 remote from the links 20 is forced downwardly the lazy tongs will be extended as shown in the left hand signal of Fig. 3. As soon as pressure on the lever 19 is removed the springs 21 will operate to contract the lazy tongs. It will be noted that when the lazy tongs are in extended position the pivotal connection between the lever 19 and the links 20 will be below the slot 15 so that said pivot will always be off dead center to assure effective action of the springs 21 in contracting the lazy tongs.

The signal proper embodies a casing D having spaced plates 22 therein between which the outer end of the lazy tongs extends. The extreme outer elements of the lazy tongs are pivotally mounted on a pin 23 fixed between plates 22 while the adjacent elements of the lazy tongs are pivoted intermediately on a pin 24 which is slidably engaged in slots 25 formed in the plates 22 for the purpose of supporting and guiding the outer end of the lazy tongs during its extension and contraction.

In order to operate the lazy tongs 16 selectively to extended position so as to dispose the signal D in position for observation I employ the following structure: A tubular connecting rod 30 has its ends secured to respective signals B and C and this rod embodies sections 31 and 32 connected together by a joint 33 whereby the length of the rod may be varied for convenience in applying the device to wind shields of different widths. The rod 30 is slotted longitudinally as at 34 and pivotally mounted in these slots are operating levers 35 and 36 the former of which is adapted to actuate the left hand signal and the latter the right hand signal. The lever 35 is angular and includes sections 37 and 38, the pivot of the lever being at the junction of said sections. A cable or cord 39 is connected to the outer end of the section 38 and trained through the rod 30 and over a pulley 40 carried by said rod. The cable is then connected to an arm 41 pivoted to the end of the lever 19 remote from the links 20. By this construction it will be apparent that as the upper end of the lever 35 is moved to the left it will operate the lever 19 to extend the lazy tongs 16 and dispose the signal D in signaling position. The lever 36 is also angular and pivoted at its angle portion and it will be noted that by reason of the angular formation of the lever 35 the outer end of the section 38 will pass above the pivot of said lever upon such movement of the lever and in this position of the lever the springs 21 will act through the various connections to hold the lever 35 in that position until it is manually operated in the other direction. The angular shape of the lever 36 projects in the same manner to hold the lever in signal extending position.

The casing D is provided with suitable panes of glass 29, which may be Fresnel lens as shown, against which the rays of a lamp 43 will be directed when the casing is in signaling position. This lamp 43 is suitably constructed for the purpose intended, and is supported on the shield 10 through the medium of brackets 44. The lamp includes a casing 43' which has an opening 45 therein for the passage of light rays to the signal when the latter is in signaling position, and it has also a forward opening 46 so that the lamp may form a head light.

The plates 22 within the casing D are suitably apertured as at 22', so that the light may shine through the casing when it is refracted by the panes of glass 29.

While I have illustrated and described a manually operated means for moving the signal to signaling position it will be obvious that a suitable electrical device, such as a magnet, could be employed for that purpose, in which instance a push button would be utilized by the driver to effect actuation of the signal.

What is claimed is:—

1. A signal device for vehicles comprising an attaching bracket, a casing carried thereby, a lazy tongs having one end secured in the casing, a signal carried by the other end of the lazy tongs, and including a translucent portion exposed at both sides of the signal and a lamp carried on the casing and adapted to direct its rays in a path intersecting and illuminating the translucent member in the extended position of the lazy tongs.

2. A signal device for vehicles comprising a lamp adapted for securement to a vehicle to direct its rays in a fixed path relative to the vehicle, a signal member and means for shiftably mounting the signal member on a vehicle whereby said signal member may be moved into and out of the path of light rays of the lamp.

3. A signal device for vehicles, comprising an attaching bracket, a lamp connected therewith, an extensible member connected with the bracket and a signal member carried on said extensible member and movable thereby into and out of the path of light rays from the lamp.

In testimony whereof, I affix my signature, in the presence of two witnesses.

GEORGE A. WILLIAMS.

Witnesses:
 HARRY F. HORTON,
 WM. LEONARD.